US012579700B2

(12) United States Patent
Li et al.

(10) Patent No.: US 12,579,700 B2
(45) Date of Patent: Mar. 17, 2026

(54) METHODS OF IMPERSONATION IN STREAMING MEDIA

(71) Applicant: Adeia Guides Inc., San Jose, CA (US)

(72) Inventors: Zhiyun Li, Kenmore, WA (US); Reda Harb, Issaquah, WA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 322 days.

(21) Appl. No.: 18/202,631

(22) Filed: May 26, 2023

(65) Prior Publication Data

US 2024/0394929 A1     Nov. 28, 2024

(51) Int. Cl.
*G06T 11/00*        (2006.01)
*G06F 3/0482*       (2013.01)
*G06T 7/11*         (2017.01)

(52) U.S. Cl.
CPC ............ *G06T 11/00* (2013.01); *G06F 3/0482* (2013.01); *G06T 7/11* (2017.01); *G06T 2200/16* (2013.01); *G06T 2200/24* (2013.01); *G06T 2207/10016* (2013.01); *G06T 2207/30201* (2013.01)

(58) Field of Classification Search
CPC ........... G06T 11/00; G06T 7/11; G06F 3/0482
See application file for complete search history.

(56) References Cited

U.S. PATENT DOCUMENTS

2013/0268490 A1* 10/2013 Keebler ................ G06F 16/954
                                                    707/627
2020/0159870 A1*  5/2020 Bowen ................ G06F 3/04847
2022/0398538 A1* 12/2022 Jakobsson ............. H04L 9/3213

OTHER PUBLICATIONS

"Disney's face-swap technology is as impressive as it is unsettling," Engadget, https://www.engadget.com/disneys-faceswap-technology-is-as-impressive-as-it-is-unsettling-123524432.html, retrieved from the internet on Aug. 15, 2023.
Aquilina, "Roadrunner director used audio deepfake to recreate Anthony Bourdain's voice in documentary," Entertainment Weekly magazine, pp. 1-8 (2021).
Bass, "New York's New Right of Publicity Law: Protecting Performers and Producers," NYSBA, pp. 1-13 (2021).
Ferraro, "Texas Law Could Signal More State, Federal Deepfake Bans," Law 360, pp. 1-3 (2019).
https://www.deepswap.ai/, retrieved from internet Aug. 15, 2023.
https://www.d-id.com/, retrieved from the internet on Aug. 15, 2023.

(Continued)

*Primary Examiner* — Michelle Chin
(74) *Attorney, Agent, or Firm* — HG LAW LLP

(57)                ABSTRACT

Disclosed is a method comprising receiving a request to view a content item comprising a first character having a first character representation, accessing permissions regarding replacement of the first character representation, determining whether the permissions allow replacement of the first character representation, in response to the determining, generating for display an option to replace the first character representation in the content item, receiving a request to replace in the content item the first character representation via selection of the displayed option, obtaining a representation of a source individual, and generating for display a modified version of the content, wherein the first character representation is replaced with the representation of the source individual in at least a portion of the content item.

20 Claims, 17 Drawing Sheets

| | 301 | 302 | 302 | 302 | 302 | 302 | 302 | 301 | 302 | 302 | 302 | 302 | 302 | 302 | |
|---|---|---|---|---|---|---|---|---|---|---|---|---|---|---|---|
| | Query | | | | | | | Query | | | | | | | ~303 |
| | | | | 302 | | | | | | | | | | | |
| | *** ***** | 4 | 3 | 2 | 2 | 5 | 6 | *** ***** | 2 | 1 | 6 | 4 | 3 | 5 | |
| | ***** ***** | 3 | 2 | 3 | 4 | 6 | 5 | ***** ***** | 3 | 2 | 4 | 3 | 5 | 6 | |
| | Query | | | | | | | Query | | | | | | | ~304 |
| | *** ***** | 4 | 3 | 1 | 2 | 5 | 6 | *** ***** | 4 | 6 | 2 | 3 | 1 | 5 | |
| | ***** ***** | 1 | 2 | 3 | 4 | 6 | 5 | ***** ***** | 1 | 3 | 4 | 5 | 2 | 6 | |
| | Query | | | | | | | Query | | | | | | | |
| | *** ***** | 1 | 4 | 3 | 6 | 5 | 2 | *** ***** | 1 | 6 | 3 | 2 | 5 | 4 | |
| | ***** ***** | 5 | 2 | 5 | 3 | 1 | 4 | ***** ***** | 4 | 2 | 1 | 3 | 5 | 6 | |

(56)          References Cited

OTHER PUBLICATIONS https://www.youtube.com/watch?v=0sR1rU3gLzQ, retrieved from the internet Aug. 15, 2023.

Hu et al., "SVSNet: An End-to-end Speaker Voice Similarity Assessment Model," https://arxiv.org/pdf/2107.09392.pdf, 5 pages (2022).

Jia et al., "Transfer Learning from Speaker Verification to Multispeaker Text-To-Speech Synthesis," 32nd Conference on Neural Information Processing Systems (NeurIPS), https://arxiv.org/pdf/1806.04558.pdf, 15 pages (2018).

Kelly et al., "Identifying perceptually similar voices with a speaker recognition system using auto-phonetic features," https://www.oxfordwaveresearch.com/wp-content/uploads/2019/03/OxfordWaveResearch-Kellyetal-S16_show_and_tell_voice_similarity.pdf.

Lalla et al., "Artificial intelligence: deepfakes in the entertainment industry," WIPO Magazine, pp. 1-7 (2022).

Li et al., "Automatic Recognition of Smiling and Neutral Facial Expressions," 2010 IEEE Dicta, https://ieeexplore.ieee.org/document/5692624, abstract only, 4 pages.

Li et al., "FaceShifter: Towards High Fidelity and Occlusion Aware Face Swapping," https://arxiv.org/pdf/1912.13457.pdf, 11 pages (2020).

List of video games based on films—Wikipedia, https://en.wikipedia.org/wiki/List_of_video_games_based_on_films, retrieved from the internet on Aug. 15, 2023.

Ma et al., "Real-time Face Video Swapping from a Single Portrait," I3D 2020. http://graphics.cs.uh.edu/wp-content/papers/2020/2020-I3D-RealTimeFaceSwapping.pdf, 10 pages.

Moon, "Warner Bros. 'Reminiscence' promo uses deepfake tech to put you in the trailer," Engadget. retrieved from the Internet Jul. 25, 2023.

Perez, "MyHeritage and D-ID partner to bring photos to life with both animations and voice," TechCrunch, pp. 1-19 (2022).

Reminiscence—Now Playing in Theatres & HBO Max (bannisterandassociates.com) p. 1 retrieved from internet Jul. 25, 2023.

Riparbelli, "Snoop Dogg," Synthesia, pp. 1-4 (2023).

Sadovnik et al., "Finding your Lookalike: Measuring Face Similarity Rather than Face Identity," https://openaccess.thecvf.com/content_cvpr_2018_workshops/papers/w48/Sadovnik_Finding_Your_Lo okalike_CVPR_2018_paper.pdf, pp. 2458-2466 (2018).

Tandel et al., "Voice Recognition and Voice Comparison using Machine Learning Techniques: A Survey," https://ieeexplore.ieee.org/document/9074184, Abstract only, 4 pages (2020).

Thies et al., "Face2Face: Real-time Face Capture and Reenactment of RGB Videos," TUM Visual Computing & Artificial Intelligence, http://niessnerlab.org/projects/thies2016face.html ,2 page (2023).

Tom Cruise Hyper-realistic DeepFake, https://www.youtube.com/watch?v=t5pufwWX540, retrieved from the internet on Aug. 15, 2023.

Yuan et al., "Improving Zero-Shot Voice Style Transfer via Disentangled Representation Learning," https://arxiv.org/abs/2103.09420, 17 pages (2021).

* cited by examiner

101 — User selects "Stranger Things"

102 — Replacement options identified and displayed

103 — User selects replacement option

104 — Replacement is stored

105 — Replacement is requested and retrieved

106 — System displays content with replacement

1401

1402

1600

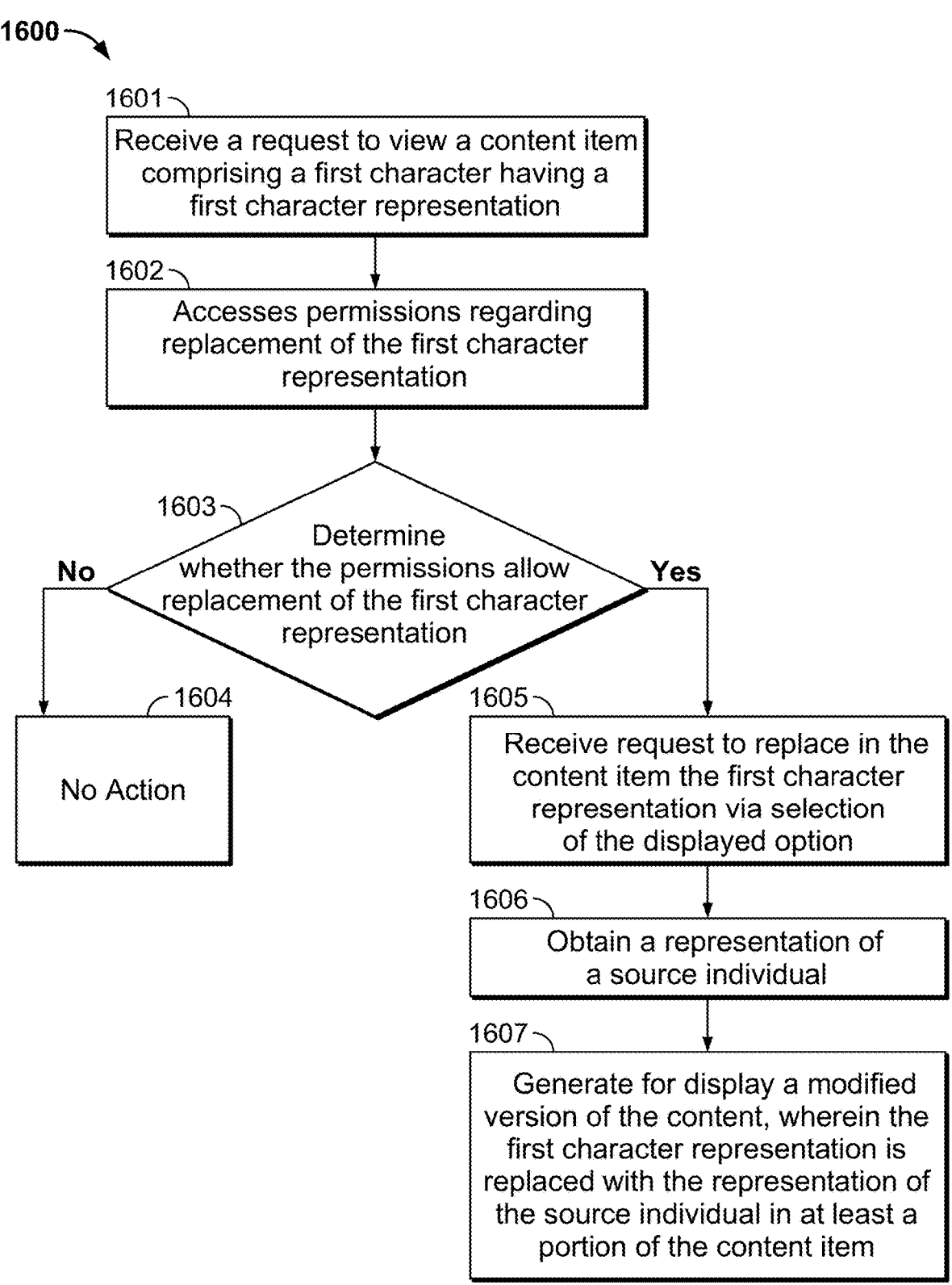

1601

Receive a request to view a content item comprising a first character having a first character representation

1602

Accesses permissions regarding replacement of the first character representation

1603

Determine whether the permissions allow replacement of the first character representation No Yes

1604

No Action

1605

Receive request to replace in the content item the first character representation via selection of the displayed option

1606

Obtain a representation of a source individual

1607

Generate for display a modified version of the content, wherein the first character representation is replaced with the representation of the source individual in at least a portion of the content item

FIG. 16

METHODS OF IMPERSONATION IN STREAMING MEDIA

BACKGROUND

Video and audio processing technologies have advanced to produce altered video or audio in which an individual's appearance, expression, or voice is replaced with that of another individual. The result can be achieved using machine learning and applied to a variety of individuals.

SUMMARY

Disclosed herein are systems and methods to provide a capability to replace actors or characters in a movie, TV show, video advertisements, or other video with individuals, such as friends, family, or the user him or herself. This replacement allows the system to generate for presentation a video with a preferred individual to create new engaging experiences.

In one approach the creation of the video with the replacement(s) takes place at the user device, such as a personal computer or other device(s) on a local premises or local area network. Some personal devices typically have limited computing power, however. The task of generating the new replacement video is processing intensive and can easily overwhelm these personal systems. As a result, the system may experience lags and malfunctioning, interrupting the experience, if not preventing the replacement all together.

In another approach a server connected to the system generates the altered video containing the replacement(s). This approach similarly interrupts the experience as it requires that the server first takes the time to create the altered video before the system presents the video. This creates an inconvenient and awkward waiting period between receiving a request for the altered video and presenting the altered video. It is also highly inefficient as typically the system alters the entire video although only some portions of the video require alteration.

In another approach all and any replacements are allowed. This approach can lead to difficulties as excessive replacements complicate and lengthen processing. Further, some replacements are more challenging than others, such as where the individual has few features in common with the original character. Allowing a wide variety of replacements can create issues such as lag or processing failures when the system takes on challenging or impossible replacements.

To solve these problems an approach is described herein where the system receives a request to view a content item and accesses permissions regarding replacement of a character in that content item to determine whether the permissions allow replacement of the character. If the replacement of the character is allowed, the system generates for display an option to replace the character in the content item. Upon receiving a request to replace in the content item the first character representation, the system obtains a representation of a source individual, and generates for display a modified version of the content in which the character is replaced with the representation of the source individual in at least a portion of the content item. This approach ensures that requested replacements can be processed accurately within a reasonable time frame since allowing only specific alterations limits the number of modifications requested. As each modification requires additional processing power and time, limiting modifications reduces the processing load.

In another approach, upon receiving a request to view a content item, the system may begin generating for display the segments of the requested content item that do not contain replacements by accessing the manifest file of the content item and identifying the locations of those segments. The manifest may also include replacement permissions similar to the approach described above. The manifest may also include a replacement opportunity, a indication of that the system may insert a replacement, with a customized element or tag. The system may begin displaying these original segments. The system may then process segments of the requested content item that contain a replacement to generate altered segments and store those generated altered segments at a new location. The system may then update an existing manifest file or create a new manifest file containing the new locations of any generated segments that contain the replacements.

In one approach this processing may take place while the content item is on a user device. For example, a video may begin to play segments that do not contain replacement while segments that do contain replacements are being processed. Then, when the generated segments are reached in the presentation of the content item, the system retrieves these altered segments using the newly created manifest file. This approach avoids delay by limiting processing to only the segments containing replacement rather than the entire video and allowing the content item to be presented while generating the replacements with seamless replacement of the manifest file allowing for uninterrupted presentation of display of un-altered portion of content item interspersed with altered portions, as altered portions are generated and stored (e.g., the system creates a manifest file that includes the original location of a first segment of a movie, which does not contain a replacement, followed by an updated location for the next segment, which does contain a replacement, followed by the original location of a third segment which does not contain a replacement).

BRIEF DESCRIPTION OF THE DRAWINGS

FIG. 16 is a flowchart illustrating an example of the disclosed method.

<center>DETAILED DESCRIPTION</center>

The present invention is directed to a synthetic media platform which allows the system to replace individuals, such as actors, characters, or others subjects (e.g., pets), in a media asset with another individual. It should be noted that while the description includes discussions of the media platform system in terms of video media, the system may apply to any media asset type including, audio, advertisements, live broadcast, clips, stills, or other forms. In one embodiment the replacement individual is an audience member. In another embodiment the system may receive a selection regarding which individual to replace. In another embodiment, the content owner indicates which individuals may be replaced.

Figure 1:
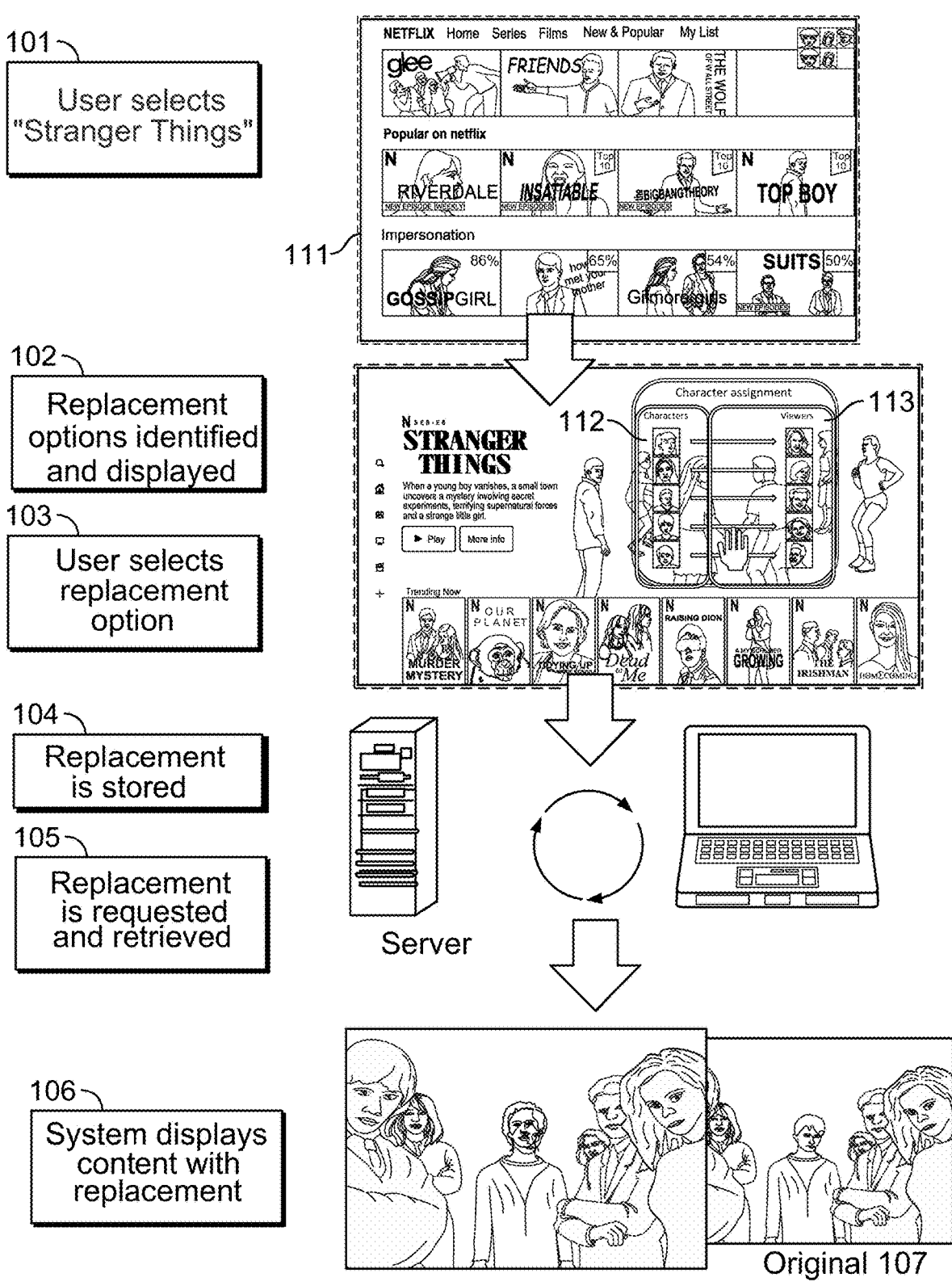
FIG. 1 shows an example embodiment of the present disclosure.

FIG. 1 shows an example embodiment of the present disclosure. The embodiment begins at 101 where the system receives a request for a content item, for example "Stranger Things," from the user interface 111 which presents content items available for consumption. At 102 the synthetic media system determines replacement parameters for the content item and displays replacement options, seen in FIG. 1 as a list 112 of characters available for replacement. In some embodiments, the system presents a prompt for replacement when a replacement is possible and/or fitting. Determining replacement parameters may include in some embodiments determining which actors may be replaced, which scenes may include replacements along with any other relevant information. This information may be available for example in a manifest file of the content item. The example in FIG. 1 shows five characters available for replacement. At 103 the system may receive a selection of the option to replace a character in the content item. In one embodiment this selection indicates source individuals to replace characters and the system receives the selections in selection interface 113. The system next processes the replacement in some embodiments and the resulting media containing the replacement is stored at a server at 104. In some embodiments the system processes the replacement by altering segments of the content item in which replacements occur. The system may process these segments using algorithms which are described below in FIGS. 2A and 2B. In some embodiments the replacement is stored at a server and the server location of the replacement is included in an updated manifest file of the content item. In this way, when segments containing replacements are reached during playback, the replacement, rather than the original 107, is requested and presented. At 105 the system receives a request to play the content with the replacement and the replacement is requested and retrieved from storage. In an embodiment the system then causes the content item to be displayed with the replacement 106. The displaying the content may in some embodiments comprise, using the manifest file of the content item, locating and presenting a segment of the content item that does not include a replacement. The system may next, using an altered manifest file that includes the server locations of the segments of the content item including the replacement(s), locate and present a segment that includes a replacement when those segments are reached during playback. The system then presents content item in the form of both original segments of the content item and altered segments which contain replacements. In some embodiments, the system may begin playing all segments, both those that do and do not contain replacements, while the replacements are processed. Then in some embodiments, if when a replacement is ready, the segment containing the replacement has already been played without the replacement, the system may display an option to replay the segment with the replacement.

Figure 2A:
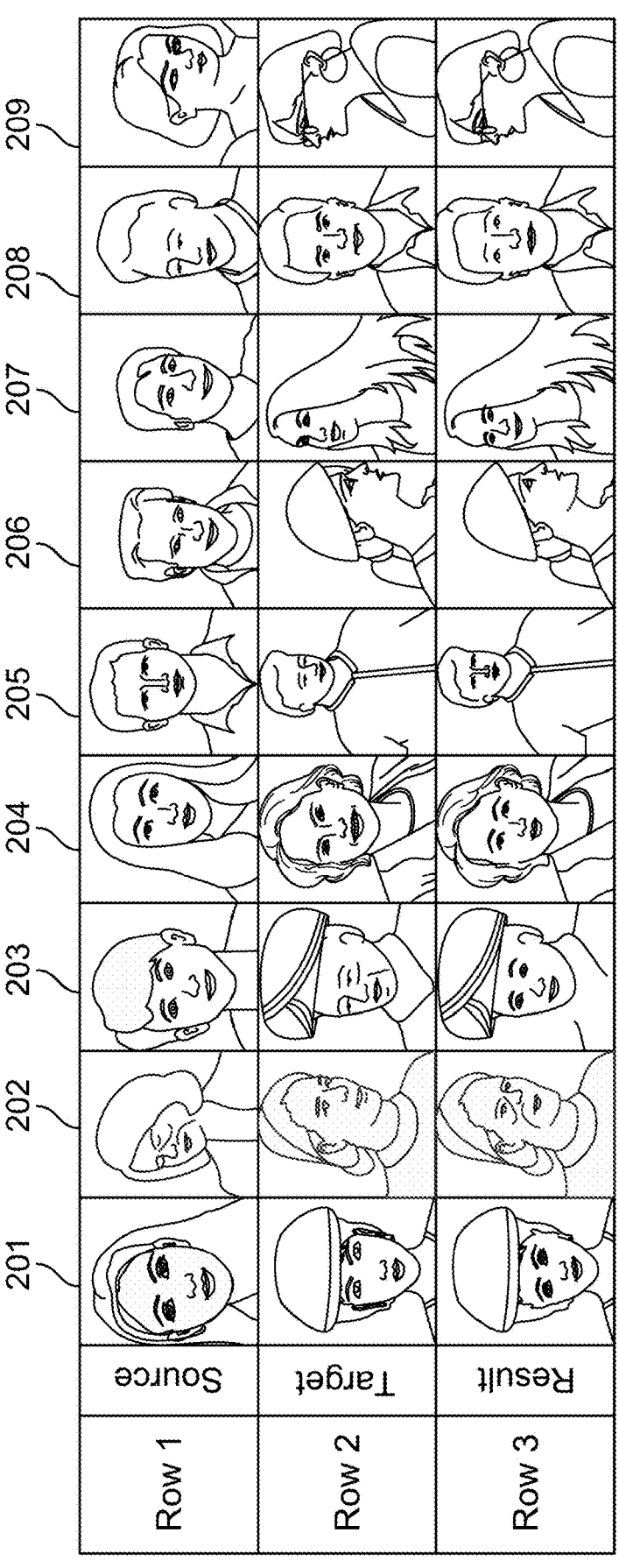
FIG. 2A illustrates an example effect of facial replacement in a digital image.

FIG. 2A illustrates the effect of facial replacement in a digital image. The figure is a table with columns and rows. Each column is an example, or case, of facial replacement software with nine examples in total, cases 201, 202, 203, 204, 205, 206, 207, 208, or 209. Each row represents an element of the facial replacement: row 1 represents the source, which is the individual who will replace that of the existing image, row 2 represents the target, which is the existing image which will be altered with a replacement, and row 3 represents the result, which is the final form where the face, or other characteristic such as body or voice, in the existing image is replaced with the source characteristic. In some embodiments, the user and the source will be the same person, that is, the user will replace a character in the video or other media asset with a likeness of him or herself. The term "user" is used in this disclosure to refer to an individual providing preferences, input, or directions to the synthetic media system and consuming the content provided by the synthetic media system. The term "source" is used in this disclosure to refer to the individual being inserted in the media, that is an individual connected to the face, body, or voice that will replace that of a character in an image or video or other media asset. In some embodiments, only a single photo from the source is required to replace a given character in an image or images. As seen in the figure, in one embodiment, the original facial expressions are maintained, but the face is replaced by the source face. For example, a smile is still a smile, but in the new image the same smile is on a different face—that is to say, there is a different person in the new image where the new person has the same expression as the person in the original image. This operation also works with various challenging occlusions as shown in cases 202 and 203. Despite the fact that the eyes are closed in the source face of case 202, the system is able to use the source image to replace the face of the target image. Similarly, in case 203, the face of the source image is obstructed by a hair style, yet the system is still able to use the face of the source image to replace the face of the target image.

Figure 2B:
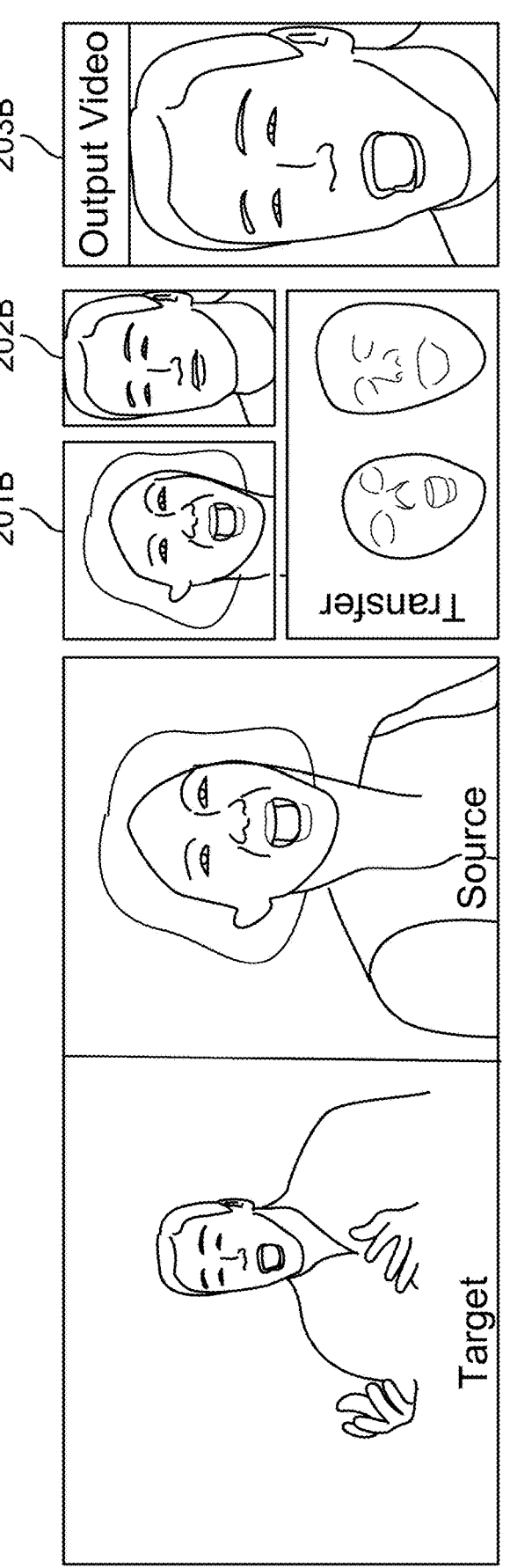
FIG. 2B illustrates an embodiment in which the facial expression of the source is transferred to the target to create output image.

FIG. 2B illustrates an embodiment in which the facial expression of the source 201B is transferred to the target 202B to create output image 203B. In one embodiment, at any moment, the source's facial expression may be captured in real-time and replace an existing expression. For example, in FIG. 2B, a confused expression can be replaced by an angry expression, while keeping the face of the target 202B. In one embodiment the techniques of FIGS. 2A and 2B can be used together, i.e., the system may replace both the face and expression at the same time.

Figure 3:
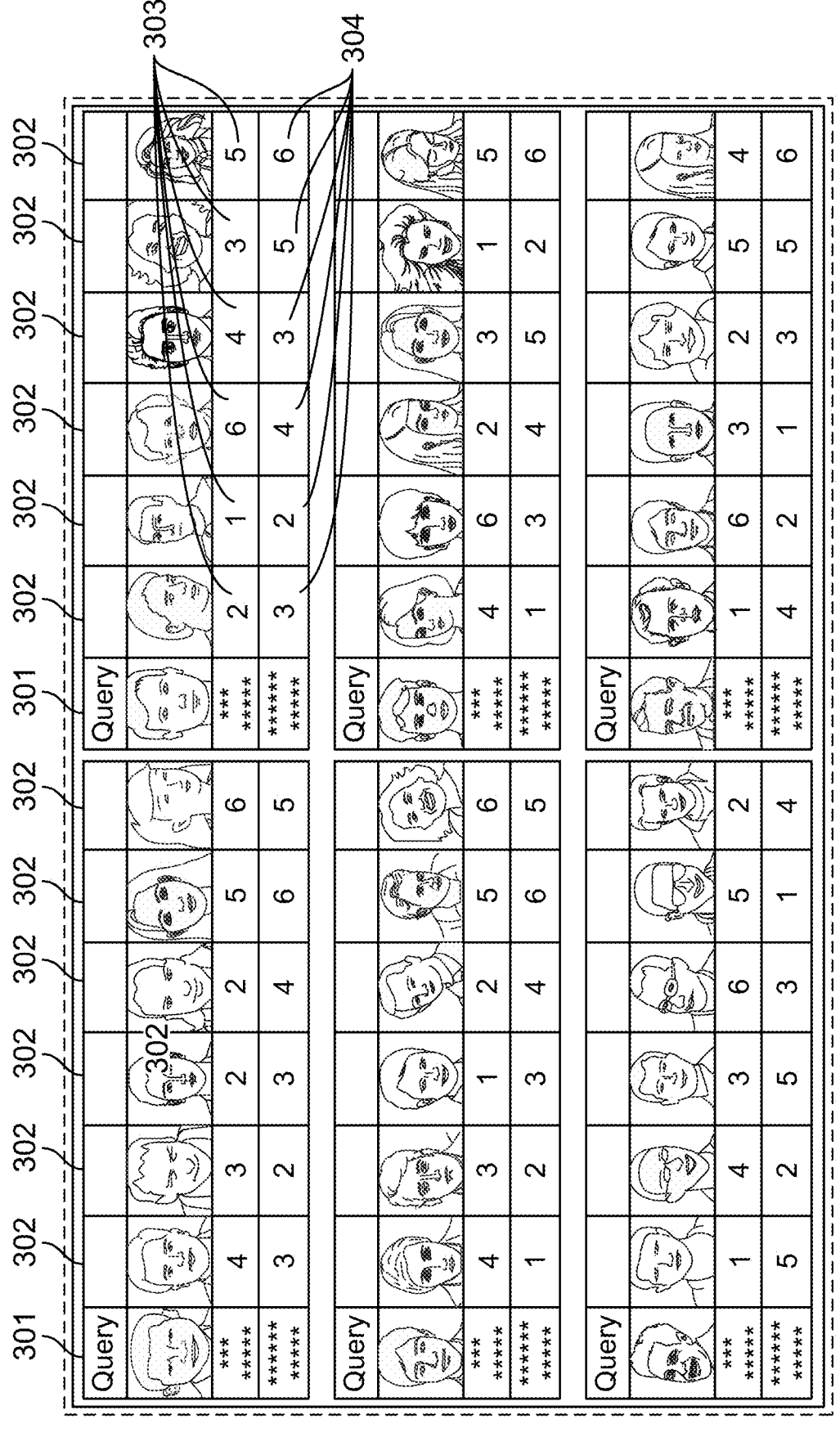
FIG. 3 shows example input and output images of an algorithm designed to measure the similarity between two sources in one embodiment of the disclosure.

In another embodiment, algorithms are designed to measure the similarity between two faces or other characteristics. Examples of such algorithms are shown in FIG. 3. FIG. 3 shows source faces 301. Source faces 301 are input into the algorithm. The algorithm then searches its database of faces to select similar faces, 302. The similar faces 302 are presented to the user as search results. In some embodiments such as that seen in FIG. 3, the search results of similar face 302 include rankings 303, that indicate which similar faces 302 are most and least like the source face 301. As seen in the embodiment shown in FIG. 3, the ranking 303 may be in the form of a number ranking where each of similar faces 302 is given a different number ranking, in the case of FIG. 3 a number 1-6, the number indicating the order of similarity in the search results from most to least similar. In some embodiments, such as that seen in FIG. 3, the search results of similar faces 302 also include a VGG (Visual Geometry Group) ranking 304.

Figure 4:
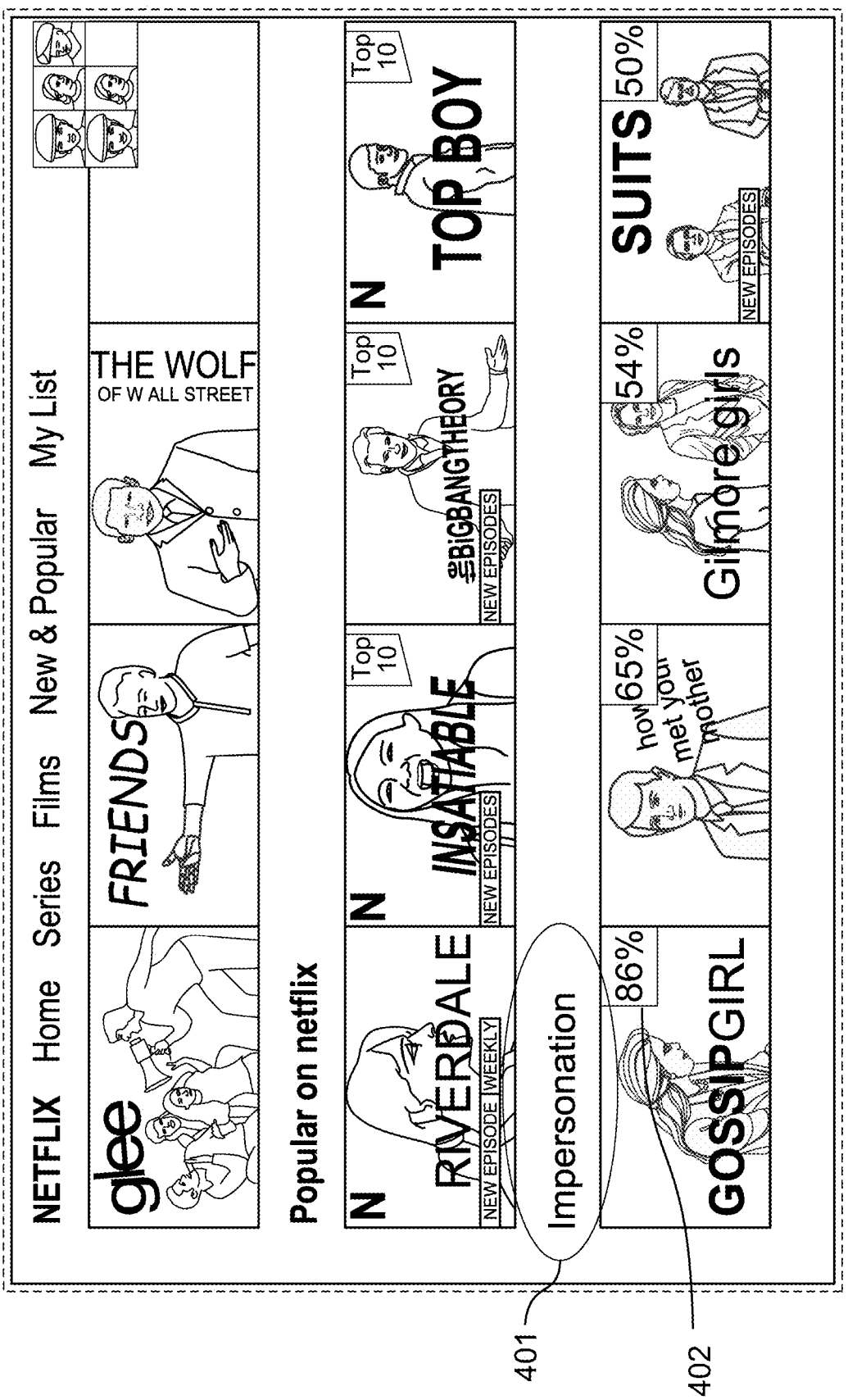
FIG. 4 shows a user interface of an algorithm used to recommend content with a high success rate for character representation replacement in one embodiment of the disclosure.

In some embodiments these algorithms may be used to create or recommend content with a high success rate for replacement, that is, content with characters that have similar physical features to those of the sources. A user interface for such an embodiment is shown in FIG. 4. In FIG. 4 there is a section "Impersonation" which recommends content items 401 that may be subject to characters replacement. Each content item 401 further includes an indicator 402 which indicates a level of difficulty in replacing characters. In FIG. 4 the indicator 402 is represented as a percentage match, for example FIG. 4 shows the television show "Gossip Girl" with 86% match rate, indicating that based on similarities between a source and a target there is an 86% chance that the replacement will be possible or realistic. In some embodiments, the synthetic media system may forbid a replacement if the success rate of replacement is too low, for example, if a percentage match is below a given threshold. In some embodiments, the system may enact the replacement automatically without receiving a request to do so.

Figure 5:
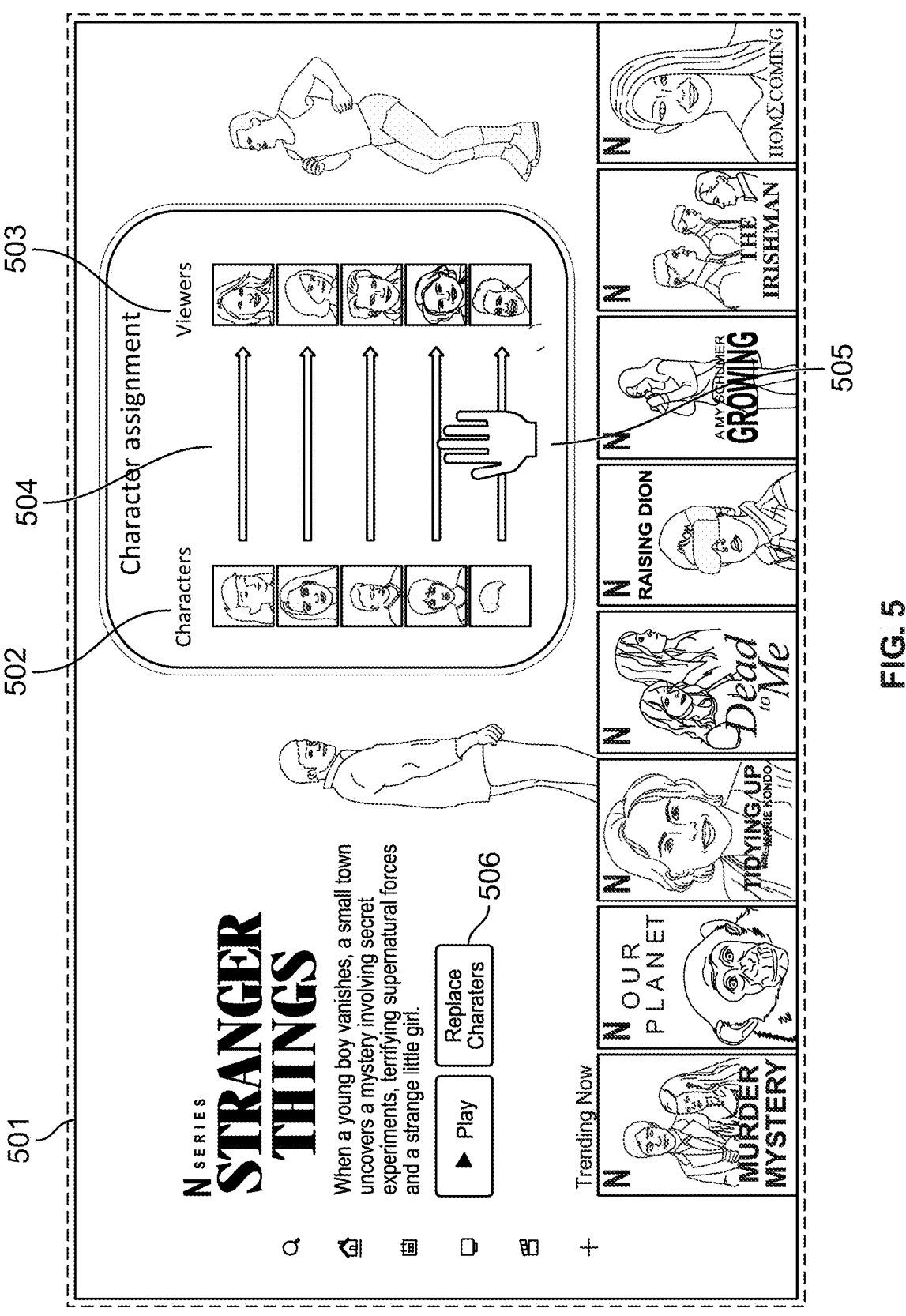
FIG. 5 shows a user interface of an embodiment used to search a given set of faces that appear in a video and find those most similar to a source face in one embodiment of the disclosure.

In some embodiments these algorithms are used to search from a given set of faces or likenesses that appear in the video or other media asset and find that most similar to a source. In such embodiments the source individuals may be assigned characters in a video or other media asset to replace based on which characters are most similar to the source. The user interface for one such embodiment is shown in FIG. 5. On one side of the user interface 501 is a list of characters 502 in a video, in this example the television show "Stranger Things." Some characters in the television show have been matched to the faces of sources 503, which may be for example faces of those viewing the video, using an algorithm that measures similarity between faces. The results 504 of the match are seen on the other side of the user interface 501. The results 504 include the faces of viewers 503 arranged to correspond to a character 502. The faces of the viewers 503 will then replace the faces of characters 502 in a modified video similar to output image 203B or the result images of FIG. 1. The interface 501 also includes a pointer 505 which may allow a user to rearrange the assigned sources as desired in some embodiments. The system may forbid a specific source assignment if the match rate, such as ranking 303, is low.

In one embodiment, the replacement is done prior to receiving a request to play the video or other media asset (e.g., based on what's in a display queue). Therefore, the altered segment or segments are available for viewing even if a device downloads the content for offline viewing. Similarly, in some embodiments the system might receive a selection on which content to enable a replacement feature to ahead of time. This includes currently available content and a wish-list (e.g., content that is not yet available). FIG. 5 shows a user interface 501 with an option 506 in which provides an option to replace the characters in a video before the video plays. When the system receives a selection for option 506, the system begins to prepare the replacement. In some embodiments, such as that shown in FIG. 5, the system pre-processes the video and modification before loading the video, as evidenced by the option 506 in which a user may select "replace characters" before loading the video. In some embodiments it does so with the streaming service's back-end, where all the selected video contents in its database will be processed to extract each character's face and voice profiles. This pre-processing should only need to perform once for each movie. For popular actors, profiles may be created from likeness (face, body, and voice) data that is widely available from existing movies, TV, or other representations and consistent across multiple records, pulling such data may not require the entire movie at all, a few images, clips, or audio segments may suffice. The resulted profiles will be indexed and used for efficient search later. Since the contents will not change, the extracted profiles do not need updates either.

Figure 6:
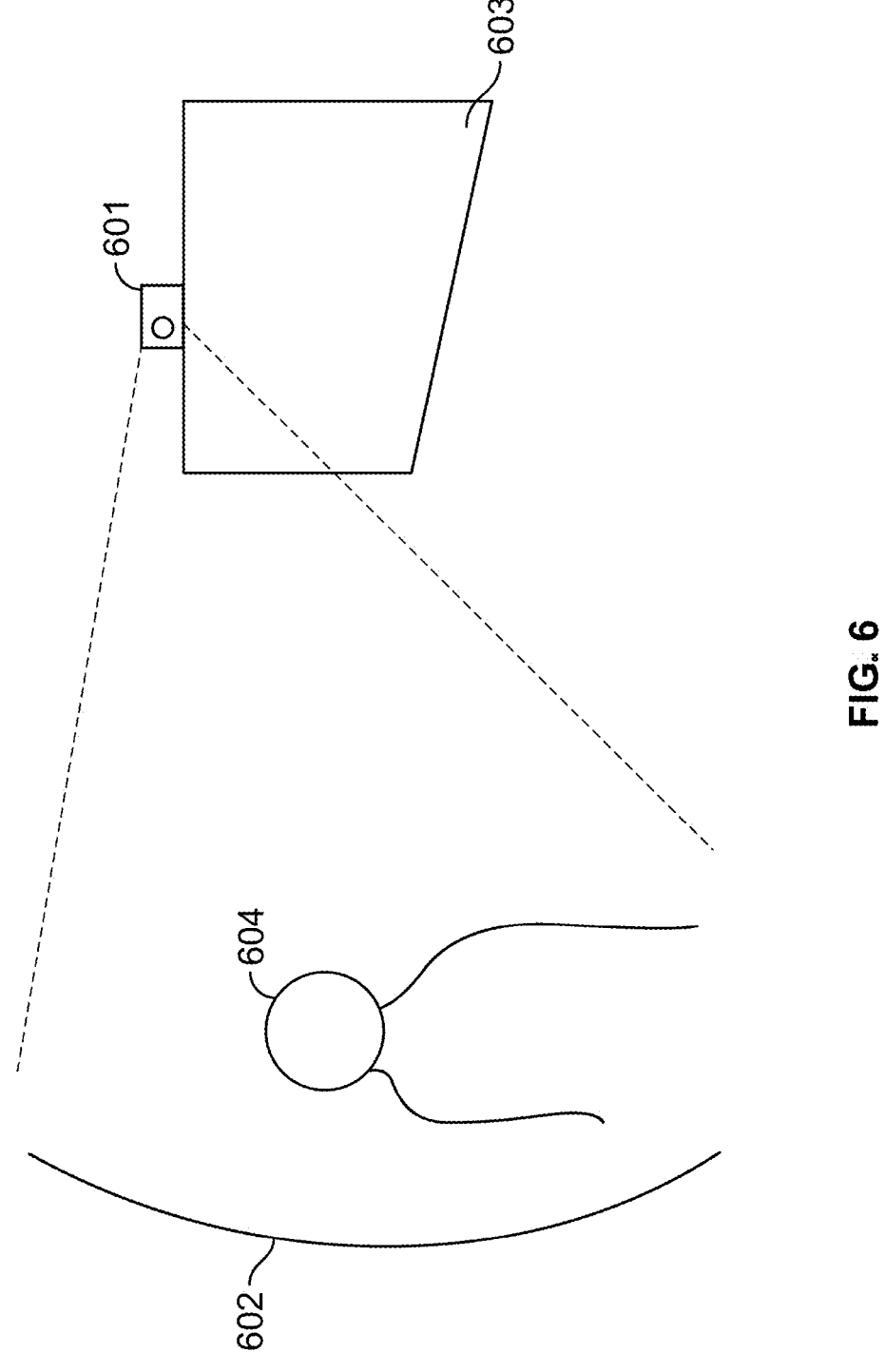
FIG. 6 illustrates an embodiment of the present disclosure in which a camera captures an image of the source individual in real time.

Facial replacement software as seen for example in FIG. 2A can be applied to video or other media asset. In this way, a face in a video, such as a movie, can be replaced by an individual in the audience or a face selected by an individual in the audience. For example, a user watching the movie "Sleepless in Seattle" might enjoy watching the film with herself and her husband as the leading roles. Using the systems and methods described in this disclosure, the user may instruct the synthetic media system to replace Meg Ryan's likeness in the movie with the user's own likeness. Similarly, the user may instruct the synthetic media system to replace Tom Hank's likeness in the movie with that of the husband of the user. As a result of these instructions, the user may then watch the movie seeing herself and her husband in the movie. In one embodiment, faces, voices, and/or bodies are replaced throughout the whole movie in real-time using a camera connected to the synthetic media system. FIG. 6 shows a camera 601 with field of view 602 connected to the display television 603 displaying a video. Camera 601 captures images of a viewer with face 604 to create the replacement image where the source is the viewer and the replacement image includes a representation of the source's face 604. As seen in the FIG. 6 the source's face 604 is within field of view 602 and therefore visible to camera 601. The system may analyze the captured images to recognize the source face 604 and extrapolate different images of source face 604, such as source face 604 in different angles or lighting. Similarly, the system may also use a microphone connected to the TV or other display to record the viewer's speech in embodiments where speech is being replaced. Alternatively, the microphone from the TV remote controller can also be used to record the viewer's speech. Such captures are particularly helpful in scenarios in which the system does not have any prior knowledge about a viewer who is the source. In one embodiment, if there is a group of family members or friends sitting in front of the TV or display, the individual faces may be segmented and recognized. Speech voice can also be matched with lip movement so that it can be associated with a specific viewer. Alternatively, the TV's or display device's companion mobile app can also be used to capture the source's face 604 and voice.

In one embodiment the system does not need a script from the movie to capture a source's voice but any short speech will do. In the example given above, a user watching "Sleepless in Seattle" at home with her husband may replace Meg Ryan and Tom Hanks without uploading images or audio of herself or her husband. Instead, the synthetic media system may, using attached mechanisms, capture images and audio representing the likenesses of the user and her husband itself.

In one embodiment, the content item is a TV series and as such similar scenes and/or characters are replaced, preferably based on preferences the system receives. In some embodiments, the replacements apply to one or more episodes or seasons in a TV series. For example, the system might always replace one specific character regardless of which episode the system displays. Real-time replacement can be achieved by the synthetic media system. For example, in response to receiving a request for viewing the content item, the synthetic media system receives or retrieves from its own database, a copy of the manifest file. In some embodiments the manifest file indicates which segments can include a character replacement. This indication can be based on a variety of factors, including stored preferences for or against characters, restrictions set by the content owner, or other factors. For example, in the film "Star Wars: A New Hope," Obi Wan Kenobi's character may be replaced when meeting Luke Skywalker early in the movie as these scenes are not pivotal, however, in the more complex or emotional scenes of Obi Wan Kenobi, such as his face off with Darth Vader, the content owner may forbid a replacement to, for example, preserve the impact of such a scene. As such, the synthetic media system can retrieve segments that may include replacements, find a suitable likeness for the replacement source, modify the content segment, and publish such segment so that it can be delivered to the user. For example, the manifest file can include a different location (URI) for modified video segments, and therefore, the media player could issue a GET request (e.g., HTTP GET) using such URI first to check if the modified segment is available. If not, then the original unmodified segment is served. The storage for the to-be-modified content can be provisioned upon instructions for playback on a content item that supports a replacement functionality or any time during the content playback. The address for this network storage can be used to refer the player to the modified segments that should be fetched for playback. For example, the location of modified content can be a storage location on an object storage service (e.g., Amazon S3).

Figure 7:
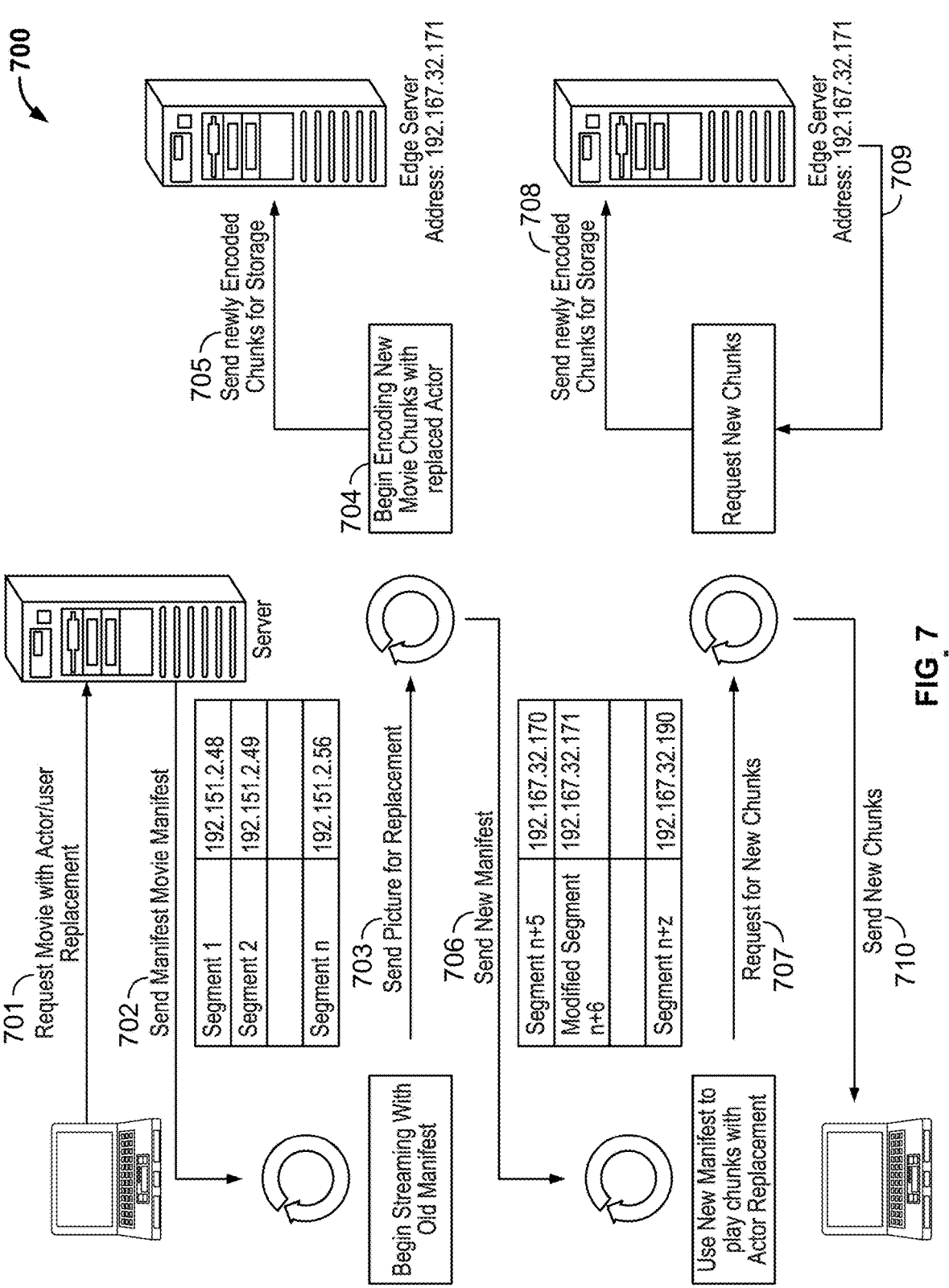
FIG. 7 shows an example modified manifest file in use in one embodiment of the disclosure.

An example process 700 of the synthetic media system receiving segments from the manifest is shown in FIG. 7. The process begins at step 701 where a user device requests a content item with a replacement. The server receives this request and at step 702 sends to the user device the manifest file for the content item. The manifest file includes a mapping of locations for each segment of the content item, for example IP addresses of servers storing the file. The synthetic media system then prepares at step 703 a replacement in the content item using the algorithms discussed above. At step 704 the system begins encoding segments for replacement, creating new, modified segments. At step 705 it stores the new segments at an edge server. At 706, the synthetic media system sends the user device an alternative manifest file in which the locations of the segments containing the replacement are updated to include the location of the new segments at the edge server. At step 707 the user device requests the new segments. At step 708 a server receives the request for new segments and requests the new segments from the edge server, which provides the new segments at step 709. At step 710 the new segments are transmitted to the user device for display.

Figures 8A, 8B, 8C:
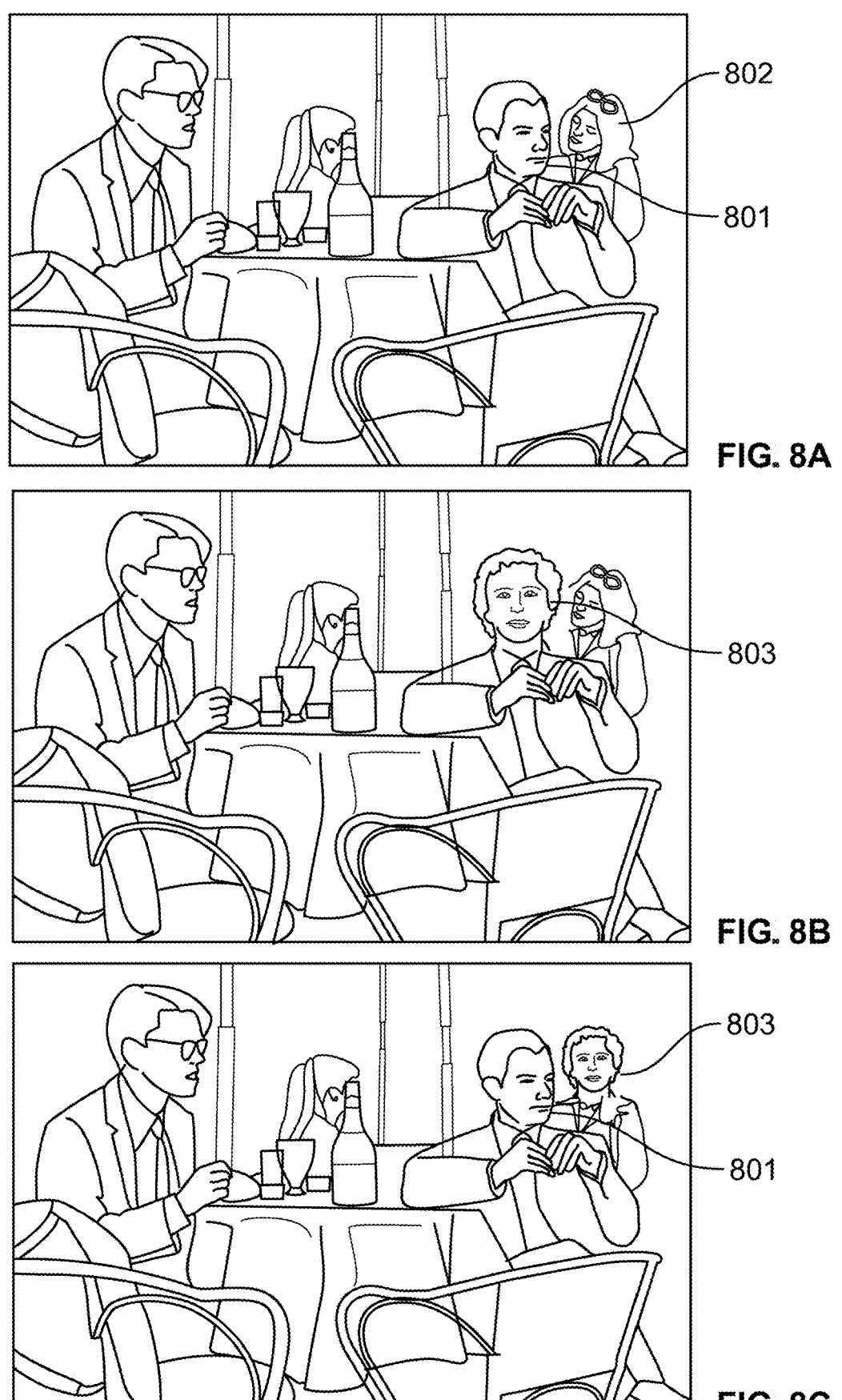
FIGS. 8A-C show an embodiment of the disclosure in which characters are replaced in a video.

FIGS. 8A-C show an embodiment in which characters are replaced in a video. In FIG. 8A, is the original image, i.e., a still of the video being played, containing a main actor 801 and background character 802. The faces of actor 801 and background character 802 are those of the actors in the original show, movie, or other video. FIG. 8B shows the same image of the video with actor 801 replaced with a source individual 803. In some embodiments, the video or other media asset includes limitations of which faces or characteristics may be replaced. For example, a-list actors may remain in a movie while background actors may be replaced. FIG. 8C shows the same image of FIG. 8A where there is a limitation preventing actor 801 from replacement. In FIG. 8C, actor 801 remains while instead the face of background character 802 is replaced with the face of individual 803. Similarly, a content owner or other entity may limit which portions may include replacement likenesses. For example, the most important scene in a video, such as action scenes, emotional scenes, or scenes vital to the storyline, may be excluded from replacement while quiet scenes may accept a replacement.

Figure 9:
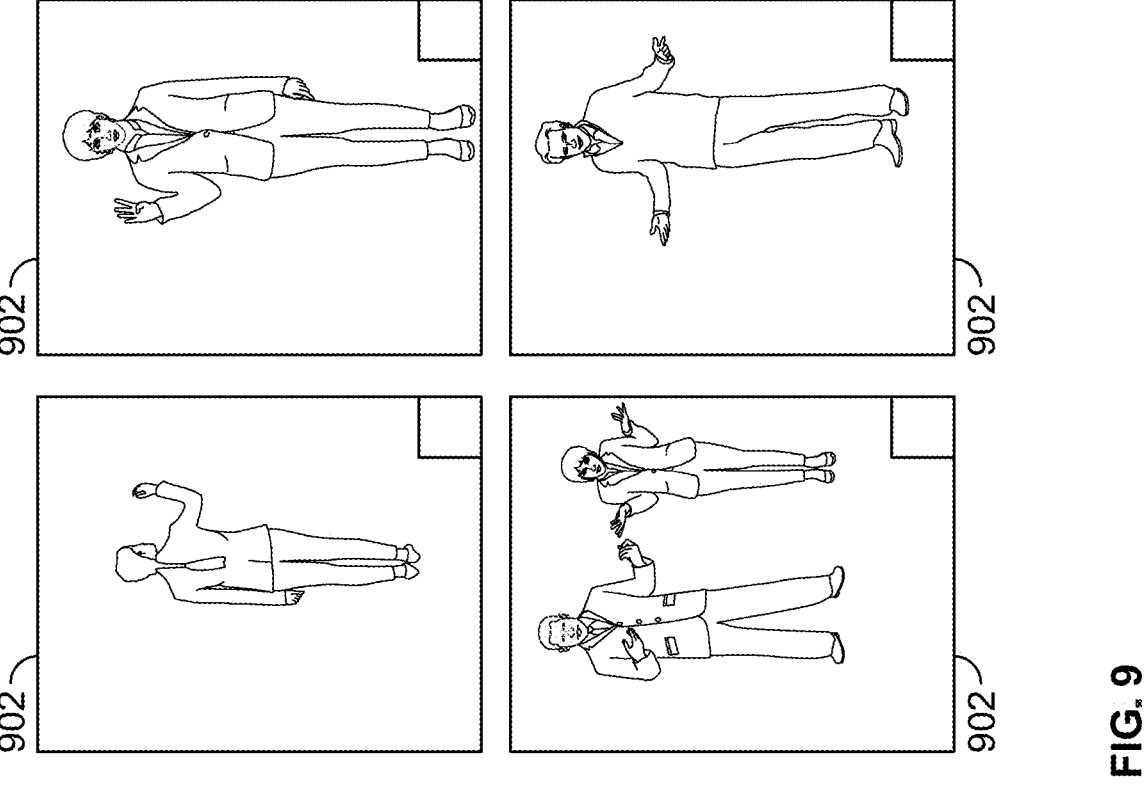
FIG. 9 shows an example user profile in one embodiment of the disclosure
Figure 9:
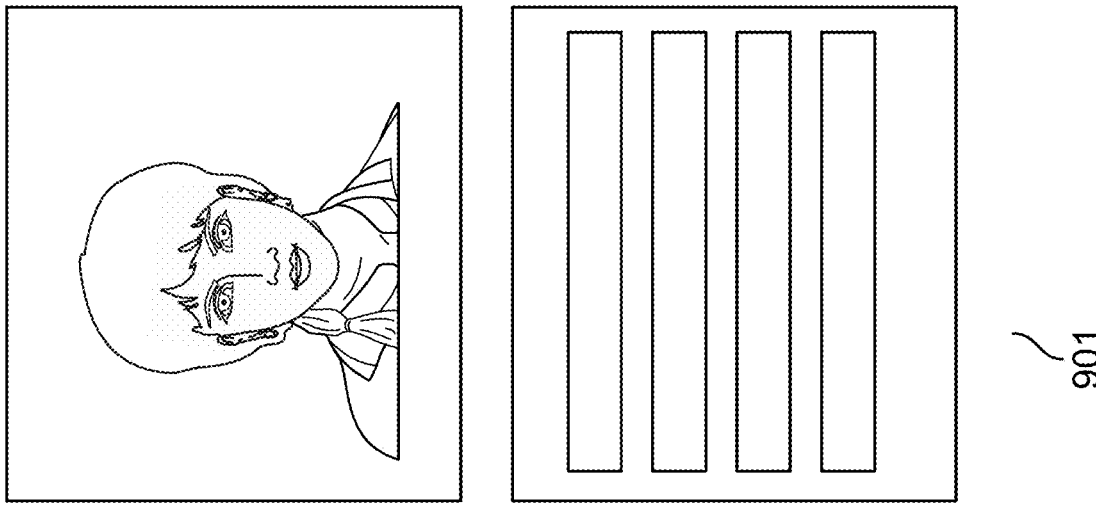

FIG. 9 shows a profile 901 which can store information on a potential source that is relevant to the system such as images 902, voice samples, preferences, and identifier. The system may have access to the profile 901 and use the profile 901 for reference images of a source. It might also use the profile 901 to determine preferences, whether of a viewer or a source, and construct the modification accordingly. In one embodiment, with granted permissions, the system can also analyze the potential source's stored photo/video albums and/or voice samples or might receive manually uploaded photos, videos, or audio clips to generate the face and voice profile. In one embodiment, the synthetic media platform can receive access to a source's authorized pictures or videos on his or her social media accounts (e.g., Facebook, Instagram, etc.) and automatically select appropriate picture or pictures to create a photorealistic video. Similarly, users create videos with their own voice on platforms like Instagram, Snapchat, TikTok, etc. Permissions may enable access to other instances of the user's voice as well including voice recording folders on a smartphone, ChromeCast, digital frames, or other locations. The synthetic media platform can use audio portions in such videos to enable voice swap as well. For example, a source might post or be tagged in a video of the source talking. The synthetic media platform may recognize the source in the video in some embodiments and analyze the image and voice of the source to recreate such likenesses in media content. In some embodiments, the replacement may occur automatically based on the profile or social media connected with an account that invoked playback of the content item. In that scenario, replacements can be based on a variety of factors, including favorite or least favorite characters, restrictions set by the content owner, or other factors.

In some embodiments the platform may implement certain criteria when selecting a source's personal media assets upon which to build the result media. For example, the platform may look for pictures with a full face as opposed to portions of the face to be able to capture the entire face of the source. Alternatively, it might look for certain facial expressions and therefore learn how the source moves his or her facial features. If the platform also does a full body swap, it may also require pictures or videos with full body gestures. In the context of voice replacement, it may also require voice samples with certain emotions. In another embodiment, it may detect and narrow down the user's media content within certain date range, for example content from the past year. In some embodiments, system may display a request or search its store for a specific likeness of a source. For example, if the system receives a request for Home Alone, the system might display a request that a source upload an image of the source with his or her mouth wide open. If the system has access to the source's media, it might already be aware of what images or content are available and whether they can be used for any given movie or other media item. The system can maintain its own index of the images that it has received authorized access to along with metadata (e.g., generated offline) that specifies characteristics of the content (e.g., happy, sad, etc.).

In one embodiment, the system might receive a preference to keep the original voice of the actor and swap only a face or physical appearance, in which case the audio portion is not required.

Figure 10:
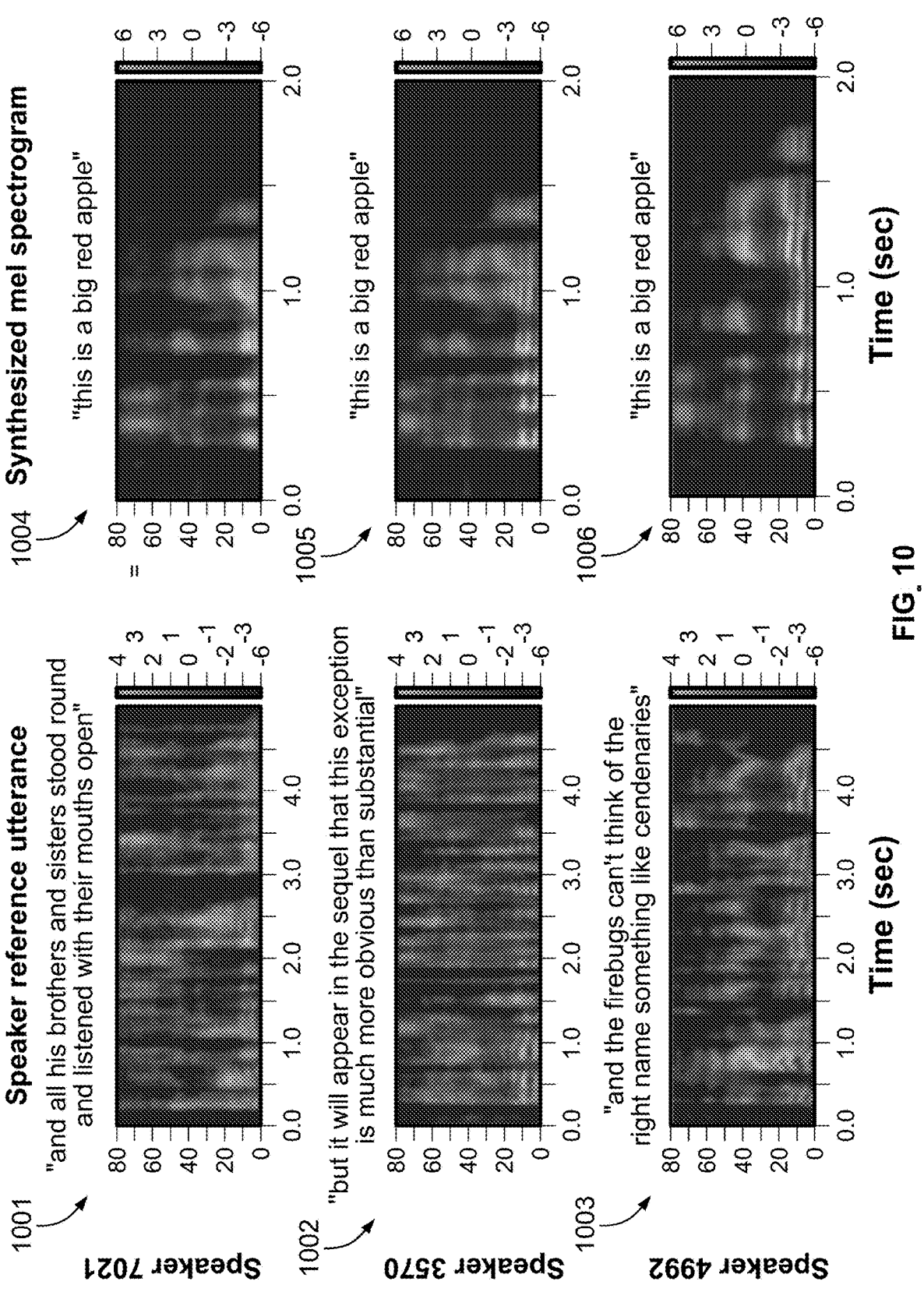
FIG. 10 illustrates examples of synthetic audio creation in one embodiment of the disclosure.

As discussed, some embodiments may include replacing an audio representation of a character, e.g., a character's voice, with that of a source individual. In such embodiments, restrictions on replacements may also apply. For example, in the movie "The Empire Strikes Back," replacements may be prohibited from altering Darth Vader's iconic voice. In some embodiments, the system may be able to replace Darth Vader's voice for all speech except the famous line, "No, I am your father." The replacement voice, that is, that of the source, need not be available as a large sample in some embodiments. Rather, short samples of speech may be sufficient to replicate the source individual's voice. FIG. 10 shows examples of synthetic speech creation based on short speech samples. One the left side is a series of collected reference utterance graphs 1001-1003. Each reference utterance is from a different speaker. On the right side are graphs mapping synthesized audio samples from each speaker based on the reference utterance. For example, Speaker 7021's reference utterance is "and all his brother and sister stood round and listened with their mouths open." The characteristics of this utterance are shown in graph 901. Based on the mapped characteristics a system is able to create the phrase "this is a big red apple" in the voice of speaker 7021 and the visualization of the created speech is shown in graph 1004. Similarly, Speaker 3570's reference utterance is "but it will appear in the sequel that this exception much more obvious than substantial." The characteristics of this utterance are shown in graph 1002. Based on the mapped characteristics a system is able to create the same phrase "this is a big red apple" in the voice of speaker 3570 and the visualization of the created speech is shown in graph 1005. As a last example the phrase "this is a big red apple," visualized in graph 1006, is created in the voice of speaker 4992 based on the reference utterance "and the firebug can't think of the right name something like cendenaries," which is visualized in graph 1003. Similar synthetic speech techniques may be used by the systems and methods described herein to create speech in the voice of a source individual.

Figure 11:
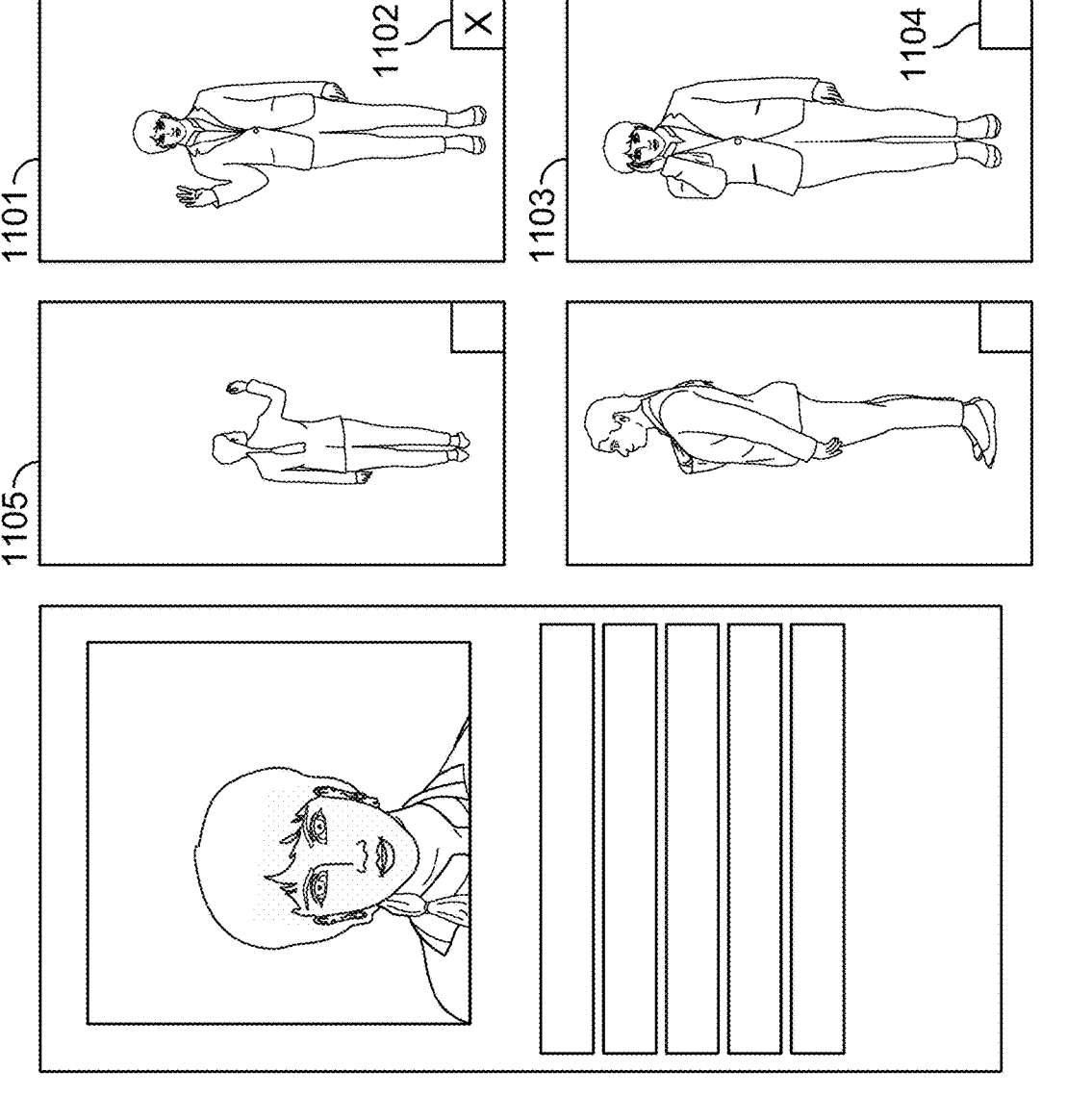
FIG. 11 shows examples of pictures that may be appropriate and inappropriate for creating modified content items in one embodiment of the disclosure.

In some embodiments, based on source's preferences and authorization to be included into the content item, a synthetic media system can fetch the most suitable likeness or images from a photo collection to create synthetic media. In one embodiment the system might have access to a source's personal photo album and the system may choose appropriate images to construct a replacement face for the video or other media asset. Synthetic media companies whose AI technology can take images of faces and turns them into high-quality, photorealistic video or other media assets, can be part of the media delivery system in order to enhance the user experience. FIG. 11 shows an embodiment in which the synthetic media system receives permission to social media pictures. The figure shows permission to picture 1101 by the marked the box 1102 in the corner of the image. Access to picture 1103 is not granted however and box 1104 is not marked, indicating that that picture 1103 will not be used.

The pictures in FIG. 11 show examples of pictures that may be appropriate and inappropriate. Appropriate pictures such as 1101 might for example show the full face of the source. In another embodiment where an actor's body is replaced, an appropriate picture might require the full body of the source. An inappropriate picture such as 1105, which only shows the back of the source, might for example not provide enough information about what the source looks like. For example, like in picture 1105, an inappropriate picture might be angled to an extent that the face is not fully visible. Similarly, in embodiments where an actor's body is replaced, an inappropriate picture might be one that for example does not provide a clear view of the body.

In some embodiments the synthetic media system may request a source to pose for pictures to obtain images that may be appropriate for replacement. In some embodiments of the synthetic media system captures these pictures by a camera connected to a display. In some embodiments the system may request specific positions or angles of the source to capture the most useful images. In one embodiment, a prompt on the display of a user device may inform a user that the system would like to capture an image of the source individual. The system may present an image of a figure in the preferred pose or instruct the source to perform specific actions such as "raise right arm." The system may then, using the camera, capture the image of the user, or source, in the preferred pose and use that image to create synthetic media. Alternatively, the system can guide the source and capture images with certain characteristics in real-time (e.g., the system may request and capture an evil laugh, etc.).

In one embodiment the system trains and maintains machine learning models on the backend of the streaming service provider to provide synthetic media. The training and resulted models will be subject agnostic. A single trained model will be applied to all face replacements. Similarly, a single trained model will be applied to all voice replacements. This training will be one-time processing and can be re-trained if needed. This will ensure the scalability.

The present invention may apply to a group watch where people are watching together at the same location or remote from each other. In such embodiments, the participants in the group watch may be the sources, that is, the replacement faces, bodies, or voices that replace original aspects of the video or other media asset. In one embodiment, after receiving permission, the platform gathers faces, bodies, or voices of the viewers based on an existing profile and applies the viewers' characteristic to characters in the watched video or other media asset. In some embodiments the platform may recognize the viewers based on images collected while the group is watching or based on the geolocation of the viewers, for example all individuals in one room might be presumed to be watching. In the example of a remote watch party, the platform may incorporate any individual with an account participating in the watch party. In another embodiment, the platform may receive permission from and apply the characteristics of a source not currently watching.

In one embodiment, if the relationship between the characters in the video or other media asset is known, the synthetic media system can modify the content to reflect or preserve this relationship. To give an example, the synthetic media system has access to a source's social account which includes pictures of the source, his or her parents, or relatives (e.g., uncle, aunt, niece, etc.), friends, etc. Then the system can enact replacements to take place on multiple targets in the scene or movie based on the relationship of the characters to each other. For example, if character A is character B's mother, and the synthetic media system receives instructions to replace character B with a likeness of a source, then the system will fetch a picture of the source's mother as well and modify the scene so that character A is replaced with a likeness of the mother. This embodiment can also be tied to a group watch feature. For example, a scene that includes the parent might be modified if the parent is present and watching the content, either at the same location as the main viewer or remote.

Figure 12:
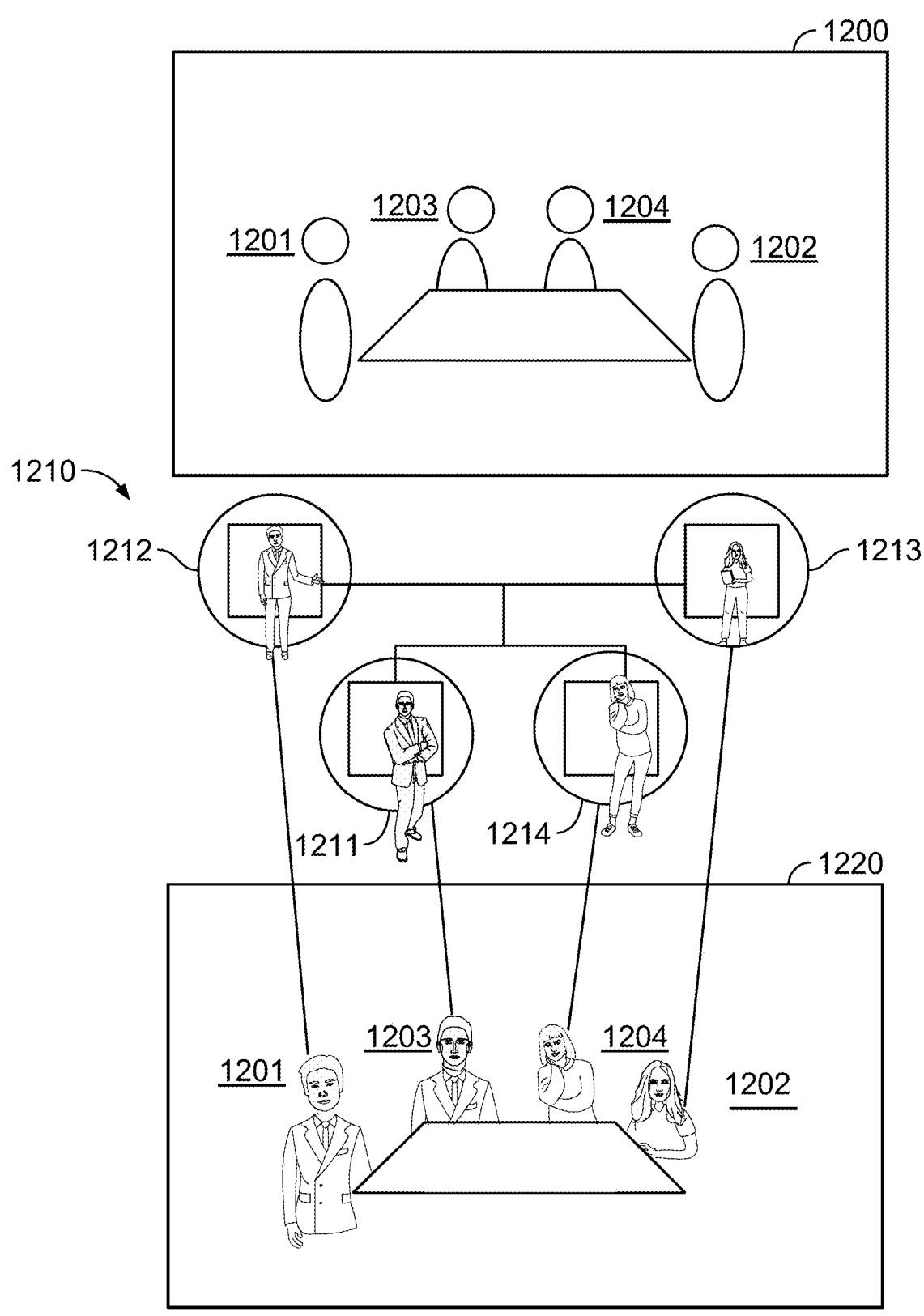
FIG. 12 illustrates preserving family relationships in modified content items in one embodiment of the disclosure.

Such an embodiment is shown in FIG. 12. FIG. 12 shows an original image 1200 from a video depicting a family seated at a dinner table. In the video, the parents 1201 and 1202 are seated at the heads of the table and the children 1203 and 1204 and seated on the side. 1210 shows family tree of a source 1211 with father of source 1212, mother of source 1213, and sibling of source 1214, 1220 shows the original image of the video after the system has modified the video to replace the characters 1201-04 with source 1211 and source's 1211 family, 1212, 1213, and 1214. As seen in 1220, the source parents 1212 and 1213 remain at the heads of the table while children 1211 and 1214 are seated at the side. In another example embodiment, in "The Empire Strikes Back" the system may replace Mark Hamill's likeness as Luke Skywalker in the movie with the likeness of a source individual. In this example, the synthetic media platform may fetch images or audio of the source's own father and replace images of Darth Vader with a likeness of the source's father, preserving the family relationship.

In another embodiment the system may receive instruction to create a relationship that should be reflected in the video or other media asset. For example, the system may replace characters in a video with the source and a friend of the source. Although the source and the friend are not related, the system might designate the friend as a parent character in the modified video.

Figure 13:
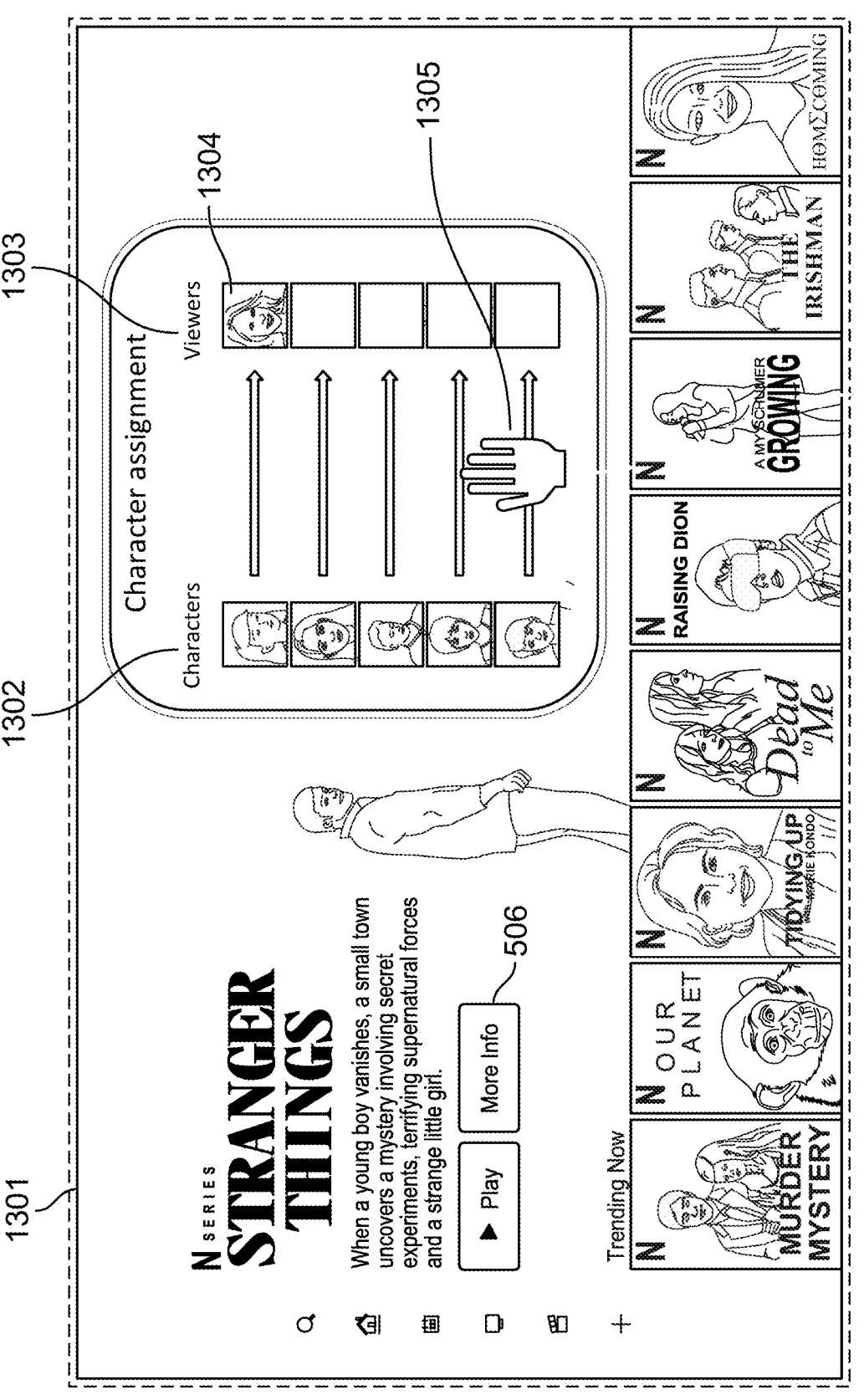
FIG. 13 shows an example user interface for designating relationships between sources in one embodiment of the disclosure.

FIG. 13 shows an example user interface 1301 for designating relationships between sources. On one side of the interface 1301 is a list of characters 1302 in a video where each character has a corresponding selection 1303 that assigns a source individual 1304 to the character. In one embodiment the system may receive selections from pointer 1305 which drags and drops a source individual to assign a character. The system may override or forbid a source individual if there is a low match rate 303 between the source and the character.

Figure 14:
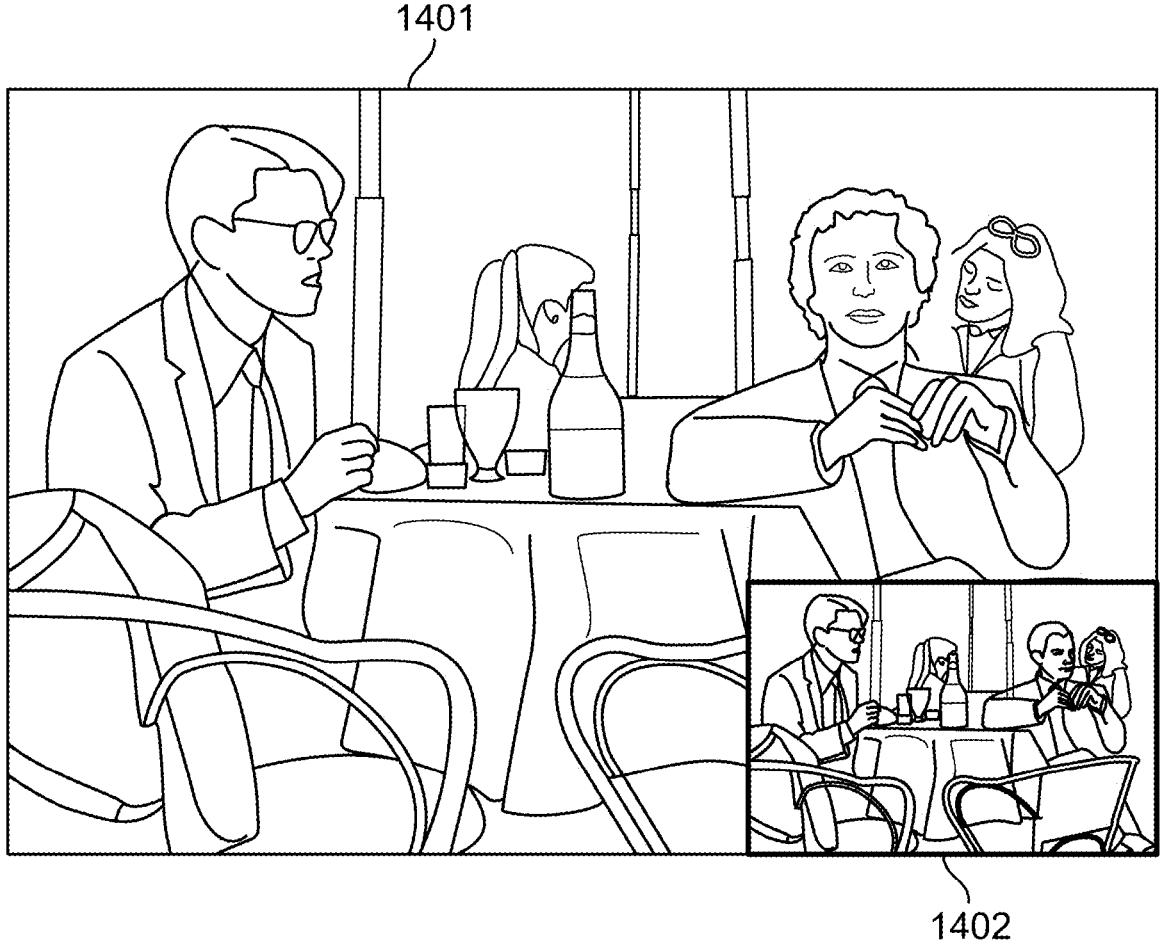
FIG. 14 shows an example display using the disclosed picture in picture feature in accordance with the disclosed systems and methods.

In one embodiment the system offers a picture in a picture option as shown in FIG. 14. In the picture in a picture option, the modified image 1401 is shown on a display while the original image 1402 is included on the same display in a smaller window as seen in FIG. 14. In such embodiments modified image 1401 may be images or images similar to that of FIG. 8B or 8C. In such embodiments original image 1401 may be images or images similar to that of FIG. 8A.

Figure 15:
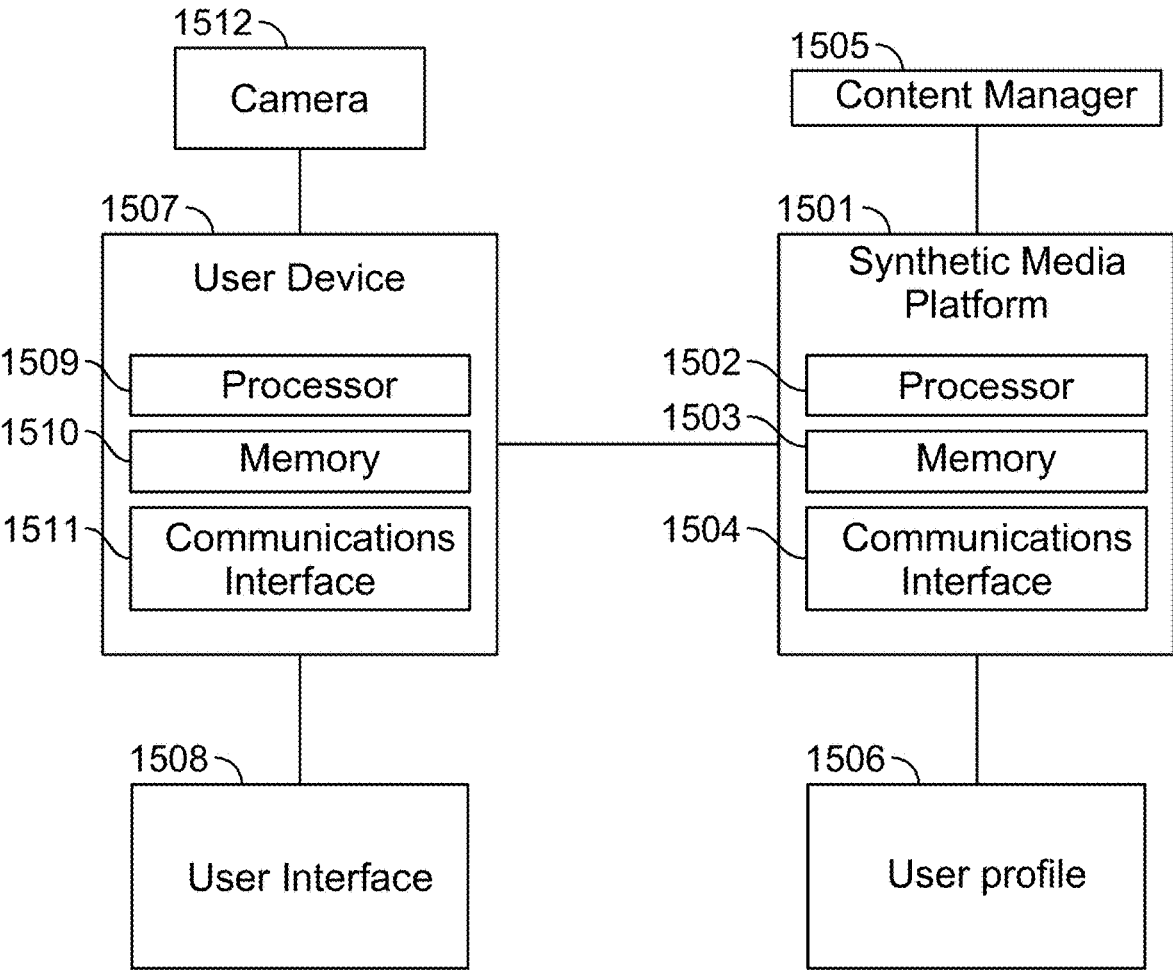
FIG. 15 shows an example environment of the disclosed systems and methods.

FIG. 15 shows an environment 1500 in which the disclosed systems and methods take place. The environment includes the synthetic media platform 1501 which includes processor 1502, memory 1503, and connection interface 1504. Processor 1502 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quadcore, hexa-core, or any suitable number of cores) or supercomputer. In some embodiments, processor 1502 may be distributed across multiple separate processors or processing units, for example, multiple of the same type of processing units (e.g., two Intel Core i7 processors) or multiple different processors (e.g., an Intel Core i5 processor and an Intel Core i7 processor). Processor 1502 may be used to send and receive commands, requests, signals (digital and analog), and other suitable data. Processor 1502 in preferred embodiments is in communication with memory 1503. Processor 1502 performs the necessary functions to create altered media content such as FIGS. 8B and 8C. Connection interface 1504 allows the synthetic media platform 1501 to communicate with other elements in the environment including in some embodiments the content manager 1505, user profile 1506, and user device 1507. Content manager 1505 is any manager of content eligible for character replacement. Content manager 1505 may be for example a streaming service or other depository of content. In some embodiments content manager 1505 includes metadata and permissions related to individual content items. User profile 1506 is a profile related to one user or source and may contain information such as preferences, allowances, and likenesses to use for replacement. User profile 1506 is akin to profile 901. User device 1507 is any device which displays or outputs for display the altered media content. In some embodiments user device 1507 is connected to a user interface 1508, such as a remote control or smartphone application, which communicates commands from the user device 1507. User device 1507 further comprises its own processor 1509, memory 1510, and communications interface 1511. In some embodiments such as that shown in FIG. 6, the user device 1507 is in communication with a camera or microphone 1512.

FIG. 16 shows an example process 1600 of the synthetic media system of the present disclosure. Process 1600 may be implemented, for example on the synthetic media platform 1501 at processor 1502 using memory 1503. At step 1601 the synthetic media system receives a request to view a content item comprising a first character having a first character representation. This may be for example a request from a user interface on a user device, such as a selection to "play" a specific content item. At step 1602 the system accesses permissions regarding replacement of the first character representation. The representations may be stored on a server or in a database from which the system accesses the permissions. At step 1603 the system determines whether the permissions allow replacement of the first character representation. If the system determines that replacement is not allowed, it may end the process by for example performing no action or issuing an error message at step 1604. In response to the determining that replacement is allowed, the system generates for display an option to replace the first character representation in the content item at step 1604. This option might be a button indicating an option "replace character" for example. At step 1605 the system receives a request to replace in the content item the first character representation via selection of the displayed option. In one embodiment the replacement is automatic and enacted without displaying an option receiving a request. In such embodiments, steps 1604 and 1605 may be omitted. Next at step 1606 the system obtains a representation of a source individual. The representation may be obtained via an input device such as a camera or microphone or may be sourced from a user profile or other database. At step 1607 the system generates for display a modified version of the content, wherein the first character representation is replaced with the representation of the source individual in at least a portion of the content item. The modified version of the content is then able to be displayed and viewed at a user device 1507.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
receiving a request to view a content item comprising a first character having a first character representation;
accessing permissions regarding replacement of the first character representation;
determining whether the permissions allow replacement of the first character representation;
in response to the determining, generating for display an option to replace the first character representation in the content item;
receiving a request to replace in the content item the first character representation via selection of the displayed option;
obtaining a representation of a source individual; and
generating for display a modified version of the content, wherein the first character representation is replaced with the representation of the source individual in at least a portion of the content item.

2. The method of claim 1 further comprising:
in response to receiving the request, accessing a manifest file of the modified version of the content comprising the permissions regarding replacement of the first character representation wherein the manifest file further comprises a network location of at least one modifiable segment of the first content item; and
wherein the generating for display the modified version of the content comprises obtaining data from the network location of at least one modifiable segment of the first content item indicated by the manifest of the modified version of the content.

3. The method of claim 2, wherein the modifiable version is modified using the obtained representation of a source individual and stored at the network location after generating for display at least a portion of the modified version of the content.

4. The method of claim 2, further comprising:
beginning to generate for display the modified version of the content item using a manifest file of the content item; and
after the accessing manifest file of the modified version of the content, continuing to generate for display the modified version of the content item using the manifest file of the modified version of the content.

5. The method of claim 1 wherein:
the source individual has a familial relationship with a second source individual;
the first character has a familial relationship with a second character, the second character having a second character representation; and
the familial relationship between the first character and second character is the same familial relationship as the familial relationship between the source individual and second source individual; and
wherein the method further comprises:
accessing permissions regarding replacement of the second character representation;
determining whether the permissions allow replacement of the second character representation;
in response to the determining whether the permissions allow replacement of the second character representation, generating for display a second option to replace the second character representation in the content item based on the familial relationship;
receiving a request to replace in the content item the second character representation based on the familial relationship via selection of the displayed second option;
obtaining a representation of the second source individual;
generating for display a modified version of the content, wherein the second character representation is replaced with the representation of the second source individual in at least a portion of the content item.

6. The method of claim 1 wherein the content item further comprises a second character having a second character representation, the method further comprising:
accessing permissions regarding replacement of the second character representation;
determining whether the permissions allow replacement of the second character representation;
in response to the determining, determining that the source individual more closely resembles the first character than the second character; and
wherein the generating for display an option to replace the first character representation in the content item is further in response to determining that the source individual more closely resembles the first than the second character.

7. The method of claim 1 further comprising receiving a request to present the modified version of the content for simultaneous display to a group of users and wherein the source individual is selected from the group of users.

8. The method of claim 1 further comprising:
receiving, using a camera or microphone coupled to a user device, input representing the source individual; and
wherein the representation of the source individual is created using the input representing the source individual.

9. The method of claim 8 further comprising:
directing the source individual to perform an action;
capturing the action via the camera or microphone; and
wherein the representation of the source individual is created using the capturing of the action.

10. The method of claim 1 further comprising:
identifying, using information received by a camera or microphone at least one audience member of the modified version of the content; and wherein the source individual is the at least one audience member.

11. A system comprising:

processing circuitry configured to:

receive a request to view a content item comprising a first character having a first character representation;

access permissions regarding replacement of the first character representation;

determine whether the permissions allow replacement of the first character representation;

in response to the determining, generate for display an option to replace the first character representation in the content item;

receive a request to replace in the content item the first character representation via selection of the displayed option;

obtain a representation of a source individual; and generate for display a modified version of the content, wherein the first character representation is replaced with the representation of the source individual in at least a portion of the content item.

12. The system of claim 11, the processing circuitry further configured to:

in response to receiving the request, access a manifest file of the modified version of the content comprising the permissions regarding replacement of the first character representation wherein the manifest file further comprises a network location of at least one modifiable segment of the first content item; and wherein to generate for display the modified version of the content comprises to obtain data from the network location of at least one modifiable segment of the first content item indicated by the manifest of the modified version of the content.

13. The system of claim 12, wherein the modifiable version is modified using the obtained representation of a source individual and stored at the network location after generating for display at least a portion of the modified version of the content.

14. The system of claim 12, the processing circuitry further configured to:

begin to generate for display the modified version of the content item using a manifest file of the content item; and after the accessing manifest file of the modified version of the content, continue to generate for display the modified version of the content item using the manifest file of the modified version of the content.

15. The system of claim 11 wherein:

the source individual has a familial relationship with a second source individual;

the first character has a familial relationship with a second character, the second character having a second character representation; and the familial relationship between the first character and second character is the same familial relationship as the familial relationship between the source individual and second source individual; and wherein the processing circuitry is further configured to:

access permissions regarding replacement of the second character representation;

determine whether the permissions allow replacement of the second character representation;

in response to determining whether the permissions allow replacement of the second character representation, generate for display a second option to replace the second character representation in the content item based on the familial relationship;

receive a request to replace in the content item the second character representation based on the familial relationship via selection of the displayed second option;

obtain a representation of the second source individual; and generate for display a modified version of the content, wherein the second character representation is replaced with the representation of the second source individual in at least a portion of the content item.

16. The system of claim 11 wherein the content item further comprises a second character having a second character representation, the processing circuitry further configured to:

access permissions regarding replacement of the second character representation;

determine whether the permissions allow replacement of the second character representation;

in response to the determining, determine that the source individual more closely resembles the first character than the second character; and wherein to generate for display an option to replace the first character representation in the content item is further in response to determining that the source individual more closely resembles the first than the second character.

17. The system of claim 11, the processing circuitry further configured to receive a request to present the modified version of the content for simultaneous display to a group of users and wherein the source individual is selected from the group of users.

18. The system of claim 11, the processing circuitry further configured to:

receive, using a camera or microphone coupled to a user device, input representing the source individual; and wherein the representation of the source individual is created using the input representing the source individual.

19. The system of claim 18, the processing circuitry further configured to:

direct the source individual to perform an action;

capture the action via the camera or microphone; and wherein the representation of the source individual is created using the capturing of the action.

20. The system of claim 11, the processing circuitry further configured to identify, using information received by a camera or microphone at least one audience member of the modified version of the content; and wherein the source individual is the at least one audience member.

* * * * *